(12) United States Patent  (10) Patent No.: US 6,530,121 B2
Hayashi                    (45) Date of Patent:     Mar. 11, 2003

(54) HINGE UNIT AND HINGE STRUCTURE

(75) Inventor: Ken Hayashi, Sagamihara (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/917,774

(22) Filed: Jul. 31, 2001

(65) Prior Publication Data

US 2002/0013979 A1 Feb. 7, 2002

(30) Foreign Application Priority Data

Jul. 31, 2000 (JP) ........................................ 2000-230899

(51) Int. Cl.$^7$ ............................................... E05D 11/10
(52) U.S. Cl. ............................ 16/330; 16/303; 16/341; 379/433.13
(58) Field of Search ........................ 16/330, 303, 328, 16/341, 344, 329; 379/433.13, 434, 433, 428

(56) References Cited

U.S. PATENT DOCUMENTS

| 5,697,124 A | * | 12/1997 | Jung ........................... 16/254 |
| 5,704,094 A | * | 1/1998 | Hartigan et al. ............... 16/277 |
| 5,715,575 A | * | 2/1998 | Kubota ......................... 16/336 |
| 5,966,776 A | * | 10/1999 | Ona ............................. 16/303 |
| 5,996,178 A | * | 12/1999 | Murray ......................... 16/284 |
| 6,115,886 A | * | 9/2000 | Fujita .......................... 16/284 |
| 6,292,980 B1 | * | 9/2001 | Yi et al. ....................... 16/303 |
| 6,295,358 B1 | * | 9/2001 | Kubota ................... 379/433.13 |

FOREIGN PATENT DOCUMENTS

JP     2001-288958     * 10/2001

* cited by examiner

Primary Examiner—Chuck Y. Mah
(74) Attorney, Agent, or Firm—Kanesaka & Takeuchi

(57) ABSTRACT

A hinge unit is formed of a case with an inside wall, a rotating cam freely rotatably accommodated inside the case, a slide cam accommodated inside the case such that the slide cam is prevented from rotating relative to the case and is moved freely in an axial direction along the inside wall of the case, and an urging device accommodated inside the case to urge the slide cam toward the rotating cam. Cam surfaces are formed on the rotating cam and the slide cam to abut against each other. The cam surfaces has a contact range from a full-surface contact to a partial contact according to a relative rotational angle of the slide cam and rotating cam.

9 Claims, 11 Drawing Sheets

HINGE UNIT AND HINGE STRUCTURE

BACKGROUND OF THE INVENTION AND RELATED ART STATEMENT

The present invention relates to a hinge unit which regulates the angle of rotation, and a hinge structure which uses this hinge unit to support a first box-form body and a second box-form body so that these box-form bodies can rotate relative to each other.

FIGS. 11 and 12 show a hinge unit 100 which is used in a foldable portable telephone. Here, a cylindrical first cam body 104 and second cam body 106 are fit over a shaft 102, so that these cam bodies can rotate relative to the shaft 102.

The first cam body 104 and second cam body 106 have the same shape, and the cam surface 104A of the first cam body 104 and a cam surface 106A of the second cam body 106 contact each other over their entire surfaces in a state that the cam bodies are rotated 90° about the shaft 102.

Meanwhile, a flange part 102A is formed on one end of the shaft 102, so that the first cam body 104 is prevented from slipping off. Furthermore, an E-ring 108 is fit over the other end of the shaft 102.

A compression coil spring 110 is mounted between the E-ring 108 and the second cam body 106, so that the second cam body 106 is urged toward the first cam body 104. Accordingly, the second cam body 106 contacts the first cam body 104 or moves away from the first cam body 104 while sliding over the shaft 102 in accordance with the opening angle of the second box-form body 112, thus applying an opening force to the second box-form body 112.

Thus, a tentatively assembled hinge unit 100 is constructed by the shaft 102, first cam body 104, second cam body 106 and compression coil spring 110. However, since various parts of this hinge unit 100 are exposed, the hinge units 100 may become entangled with each other when a plurality of hinge units 100 is packaged and shipped, so that handling is difficult.

In view of the above facts, an object of the present invention is to provide a hinge unit in which there is no entanglement of a plurality of packaged hinge units with each other even if the first box-form body and second box-form body are not attached, so that handling is easy.

Another object of the invention is to provide a hinge unit as stated above, wherein the attachment of the above mentioned hinge unit to the first box-form body and second box-form body is easy.

Further objects and advantages of the invention will be apparent from the following description of the invention.

SUMMARY OF THE INVENTION

In a first aspect of the invention, a rotating cam and a slide cam are accommodated in a case, and the rotating cam can rotate relative to the case. Meanwhile, the slide cam is prevented from rotating relative to the case, but can move in the axial direction along the inside wall of the case. Furthermore, the slide cam is urged toward the rotating cam by driving means accommodated in the case.

Here, cam surfaces are formed on the abutting surfaces of the slide cam and rotating cam, and these cam surfaces make contact with each other or move away from each other according to the relative rotational angle of the slide cam and rotating cam, so that the cam surfaces has a contact configuration ranging from a full-surface contact to a partial contact.

Thus, by the movement of the slide cam along the inside wall of the case, even if no shaft is used, the axis does not shift when the slide cam moves. Specifically, since the case is provided with the function of a shaft, an increase in the number of parts of the hinge unit can be prevented.

Furthermore, since the slide cam, rotating cam and driving means are accommodated inside the case, there is no exposure of these various parts. As a result, there is no entanglement of a plurality of packaged hinge units with each other, so that handling is easy.

Furthermore, in this hinge unit, if the case is held and a torque is applied to the rotating cam, the slide cam and rotating cam can be rotated relative to each other. Accordingly, mechanical numerical values, such as the required torque, etc., can be determined. Consequently, torque can be controlled for the hinge unit, so that there is little variation in the product.

Considering a case in which this hinge unit is used, for example, with the case attached to a shaft part on the main body side and the rotating cam connected to a shaft part on the cover side, the rotating cam rotates relative to the case when the cover is opened in the opening direction from a closed state, so that the slide cam moves along the axis of the case in the direction in which the slide cam is separated from the rotating cam by the action of the cam surfaces, thus causing the contact configuration of the cam surfaces to reach a partial contact.

When the cover is further opened from this stage, the cam surface of the rotating cam rides over the peak parts of the cam surface of the slide cam, so that the slide cam is caused to move toward the rotating cam by the driving force of the driving means. This moving force is converted by the cam surfaces into a force that rotates the cover via the rotating cam.

In a second aspect of the invention, the slide cam contacts inside the case. As a result, shifting of the axis of the slide cam is prevented even more securely.

In a third aspect of the invention, a connecting part is formed on the rotating cam, and this connecting part protrudes to the outside from the box-form case. By thus causing a connecting part to protrude from the case, it is possible to apply torque to the rotating cam without any particular need to screw a connecting tool, etc., into the rotating cam.

Meanwhile, a square guide plate is molded as an integral part of the slide cam, and this guide plate can slide along the inside wall of the case. By thus forming the case in a box shape and forming the square guide plate on the slide cam, it is possible to prevent rotation of the slide cam by means of a simple structure.

In a fourth aspect of the invention, the connecting part is formed in the shape of a square column. Accordingly, since the connecting part is prevented from rotating with respect to the accommodating part merely by forming the accommodating part with an angular shape, there is no need to use a complex shape as in conventional device, so that working costs can be reduced.

In a fifth aspect of the invention, the diameter of the circumferential wall of the aforementioned slide cam is the same as the width of the aforementioned guide plate. Accordingly, not only the side surfaces of the guide plate, but also the circumferential wall surfaces of the slide cam, slide along the inside wall of the case, so that the sliding contact area with the inside wall of the case is increased. Consequently, the slide cam can move without any shift in the axis of the slide cam.

In a sixth aspect of the invention, the aforementioned cam surface of the slide cam includes peak parts and valley parts, and the peak parts and valley parts are disposed at 90-degree intervals. Furthermore, the corner parts of the aforementioned guide plate are positioned in the vicinity of straight lines that connect the axial center of the slide cam with the valley parts as seen in a plan view.

Since the parts that slide along the inside wall of the case are the circumferential wall of the slide cam and the side surfaces of the guide plate, the contact area of the inside wall of the case relative to the circumferential wall of the slide cam and side surfaces of the guide plate can be large in order to prevent any shift in the axis of the slide cam.

Accordingly, in case where the side surfaces of the guide plate are positioned in the vicinity of the straight line that connects the axis of the slide cam and the valley parts of the cam surface, the valley parts and peak parts of the cam surface are positioned substantially at the centers of the side surfaces of the guide plate.

In this case, the length that slides along the inside wall of the case at the approximate centers of the side surfaces of the guide plate becomes equal to the thickness of the guide plate on the sides of the valley parts of the cam surface. Meanwhile, on the side of the peak part of the cam surface, the length that slides along the inside wall of the case is a length produced by adding the height of the peak part to the thickness of the guide plate.

Since the length that slides along the inside wall of the case at the approximate center of the side surface of the guide plate varies between the peak part side and valley part side, the contact area between the inside wall of the case and the circumferential wall of the slide cam and side surfaces of the guide plate varies, so that there is a danger that the axis may shift in some cases where the slide cam moves.

However, in case the corner parts of the guide plate are disposed in the vicinity of the straight line that connects the axis of the slide cam with the valley parts as seen in a plan view, the lengths that slide along the inside wall of the case at the approximately centers of the side surfaces of the guide plate are all the same.

As a result, the contact area between the inside wall of the case and the circumferential wall of the slide cam and side surfaces of the guide plate remains more or less the same. consequently, the slide cam moves more stably, so that there is no danger that the axis of the slide cam will shift.

In a seventh aspect of the invention, closing parts extend from the case, and are bent so that these closing parts prevent the slide cam from ejection of the case. Thus, since the slide cam can be prevented from ejection merely by bending these closing parts, the working characteristics are good.

In an eighth aspect of the invention, cut-out parts are formed at the base parts of the closing parts, and these cut-out parts determine the bending positions when the closing parts are bent. Thus, the bending of the closing parts is facilitated by the formation of cut-out parts at the base parts of the closing parts. Furthermore, since the bending positions are determined by the cut-out parts, protrusion of the bending position from the plane of the peripheral edge parts of the case can be prevented..

In a ninth aspect of the invention, a plurality of driving means is used. As a result, since the area contacting the slide cam is increased as compared to a case in which a single driving means is used, the slide cam can move smoothly with a good balance. Furthermore, as a result of the use of a plurality of driving means, fine adjustment of the driving force is possible.

In a tenth aspect of the invention, the rotating cam is connected to a shaft part installed in a first box-form body, the case is fastened to a shaft part installed in a second box-form body, and the first box-form body and second box-form body can rotate relative to each other.

DETAILED DESCRIPTION OF PREFERRED EMBODIMENTS

Figure 1:
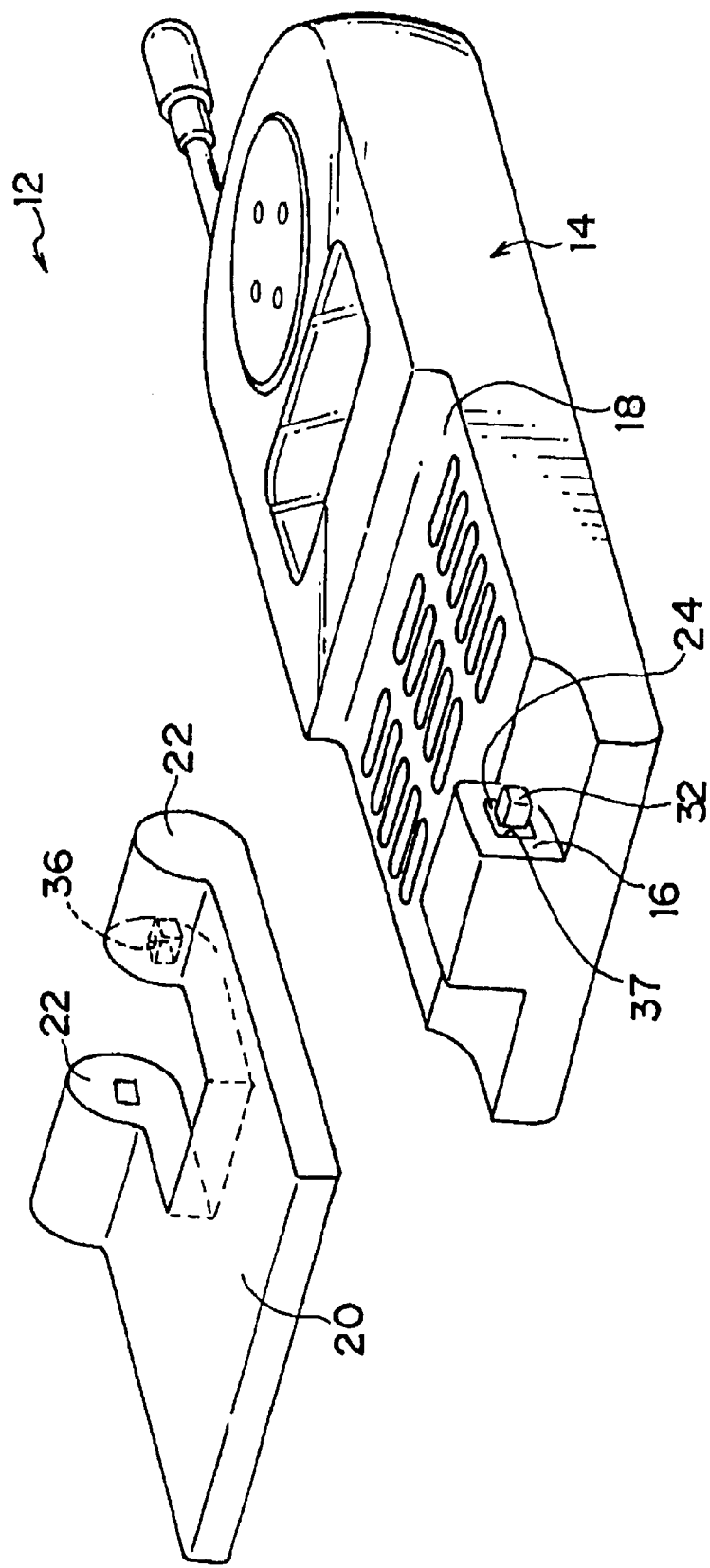
FIG. 1 is an exploded perspective view showing a main body and a cover of a portable telephone equipped with a hinge unit of the present invention.

FIG. 1 shows a portable telephone 12 using a hinge unit 10 (see FIG. 2) of the present invention.

A substantially square columnar supporting body 16 is disposed on an end portion of a main body or first box-form body 14 of this portable telephone 12. Both sides and a dial part 18 of this supporting body 16 are cut away so that when a cover or second box-form body 20 is closed, the outside surface of the main body 14 and the cover 20 become co-planar.

Furthermore, a hinge unit 10 is attached to the supporting body or shaft part 16 and bifurcated, substantially cylindrical shaft bodies or shaft parts 22 which protrude from the cover 20. The shaft parts 22 clamp both end parts of the supporting body 16. In this way, the shaft bodies 22 are supported on the supporting body 16 so that the shaft bodies 22 can rotate.

Figure 2:
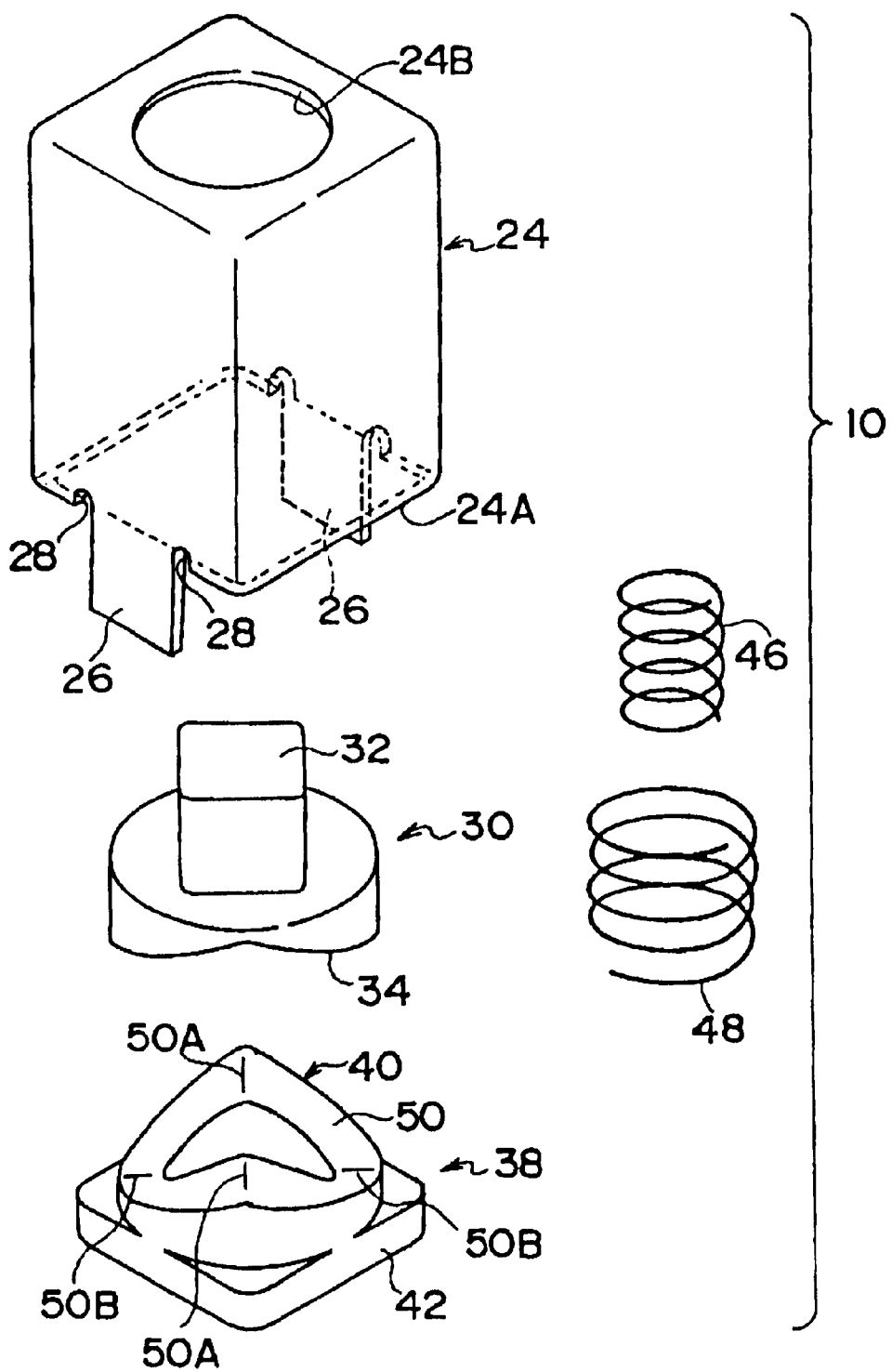
FIG. 2 is an exploded perspective view of the hinge unit of the present invention.

As is shown in FIG. 2, the case 24 has a box shape, and a round hole 24B is formed in the center of the bottom part of the case 24. A connecting part 32 formed on a rotating cam 30 (described later) can protrude into this round hole 24B.

Here, the rotating cam 30 has a substantially cylindrical shape, and is accommodated inside the case 24, so that the rotating cam 30 can rotate about the shaft part of the case 24. A cam surface 34 (described later) is formed on one end of this rotating cam 30, and a square columnar connecting part 32 protrudes from the other end of this rotating cam 30.

This connecting part 32 can engage the accommodating part 36 shown in FIG. 1. The accommodating part 36 is recessed to face the shaft part 22 of the cover 20, and has a square shape that allows engagement of the connecting part 32.

Since the connecting part 32 and accommodating part 36 have square shapes, the rotating cam 30 is prevented via the connecting part 32 from rotating relative to the accommodating part 36, as a result of the engagement of the connecting part 32 inside the accommodating part 36. Since the rotating cam and accommodating part do not have complicated shapes as in a conventional device, the working costs can be reduced.

Here, an accommodating part 37 that allows the fastening of the case 24 is recessed in the supporting body 16 to face the accommodating part 36, and the case 24 is fastened to the supporting body 16. Accordingly, when the cover 20 is rotated in a state in which the rotating cam 30 is connected to the shaft body 22, the rotating cam 30 rotates through the inside of the case 24 via the shaft body 22.

Here, furthermore, the connecting part 32 is formed with a square columnar shape, and the accommodating part 36 is formed with a square shape that allows engagement of the connecting part 32. However, it is sufficient if rotation of the connecting part 32 relative to the accommodating part 36 is prevented when the connecting part 32 is engaged with the accommodating part 36. Accordingly, the present invention is not limited to such shapes, and it would also be possible to form the connecting part with a hexagonal columnar shape, and to form the accommodating part with a hexagonal shape that corresponds to the shape of the connecting part.

Figure 3A:
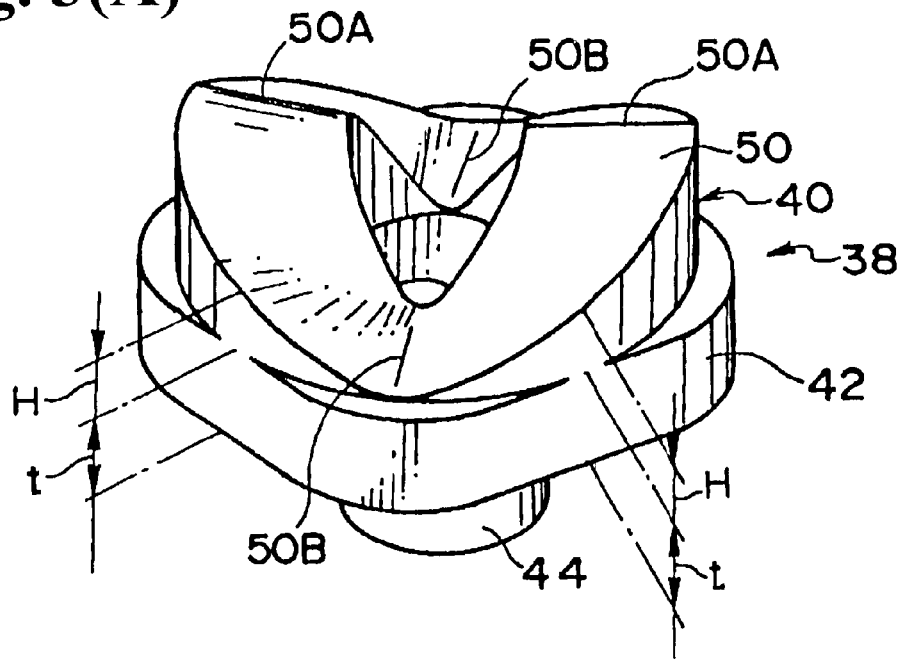
FIG. 3(A) is a perspective vies of a slide cam used in the hinge unit of the present invention.

Meanwhile, as is shown in FIG. 2 and FIG. 3(A), a slide cam 38 is accommodated inside the case 24 to face the rotating cam 30. This slide cam 38 is constructed with a cylindrical cam part 40 and a square guide plate 42, and is formed as an integral unit.

This slide cam 38 is prevented from rotating relative to the case 24 by the guide plate 42. The width of the guide plate 42 is set so that it is slightly smaller than the width of the inside walls of the case 24, so that the side surfaces of the guide plate 42 can slide along the inside wall of the case 24 and move in the axial direction of the case 24 (described later).

A protruding part 44 protrudes from the undersurface of the guide plate 42, and a small spring 46 can be mounted on this protruding part 44. One end part of this small spring 46 contacts the guide plate 42, while the other end contacts the closing parts 26 (described later) after the closing parts 26 have been bent, so that the slide cam 38 is urged toward the rotating cam 30.

Furthermore, as a result of the small spring 46 mounted on the protruding part 44, shifting of the axis of the small spring 46 is prevented. Furthermore, a large spring 48 is inserted between the small spring 46 and the case 24, and this large spring 48 contacts the case 24 from the inside.

Accordingly, even if the large spring 48 expands or contracts, there is no shifting of the axis of the large spring 48. Like the small spring 46, the large spring 48 urges the slide cam 38 toward the rotating cam 30.

Thus, as a result of the use of the above mentioned small spring 46 and large spring 48, the area that contacts the guide plate 42 is increased as compared to a case in which only a single spring is used. Accordingly, the slide cam 38 can move smoothly with a good balance. Furthermore, as a result of the use of a plurality of springs, fine adjustment of the driving force is possible.

Meanwhile, a pair of closing parts 26 extends from the peripheral edge 24A of the open side of the case 24, and these closing parts 26 can be bent toward the inside of the case 24. These closing parts 26 have an area that is capable of holding at least the small spring 46.

Figure 8A:
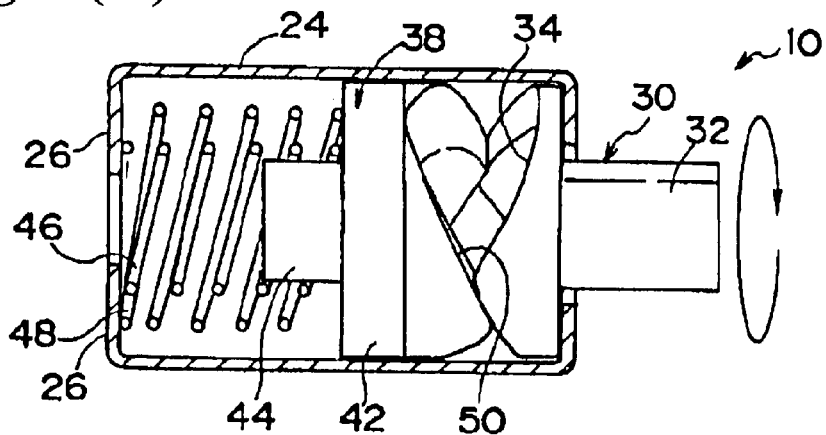
FIG. 8(A) is a side view of the hinge unit.

As a result, when the closing parts 26 are bent toward the inside of the case 24, the rotating cam 30, slide cam 38, small spring 46 and large spring 48 accommodated inside the case 24 are prevented from falling out of the case 24 (see FIG. 8(A)). Thus, since the slide cam 38 can be prevented from being ejected merely by bending the closing parts 26, the working characteristics are good.

Furthermore, circular-arc-form cut-out parts 28 are formed at the base part of each closing part 26. These cut-out parts 28 determine the bending positions when the closing parts 26 are bent. As a result, the bending of the closing parts 26 is facilitated. Furthermore, since the bending position is determined by the cut-out parts 28, protrusion of the bending position from the plane of the peripheral edge 24A of the case 24 can be prevented.

Here, furthermore, the slide cam 38 is prevented from being ejected by means of a pair of closing parts 26. However, since it is sufficient if the slide cam 38 is prevented from ejection, the present invention is not limited to this arrangement, and a single closing part 26 may also be used.

Meanwhile, it is desirable that the contact area between the inside wall of the case 24 and the slide cam 38 is large in order to prevent any shift in the axis of the slide cam 38. Accordingly, the external diameter of the outer circumferential surface of the cam part 40 is set at the same value as the width of the guide plate 42, so that the cam part 40 and guide plate 42 are of such a size that these parts make inside contact with the inside walls of the case 24.

As a result, when the slide cam 38 moves along the axial direction of the case 24, not only the side surfaces of the guide plate 42 but also the outer circumferential surface of the cam part 40 slide along the inside wall of the case 24.

Here, a cam surface 50 (described later) is formed on the cam part 40, and is disposed to face the cam surface 34. Peak parts 50A and valley parts 50B are disposed on this cam surface 50 at 90-degree intervals, and these peak parts 50A and valley parts 50B extend smoothly.

Figure 4A:
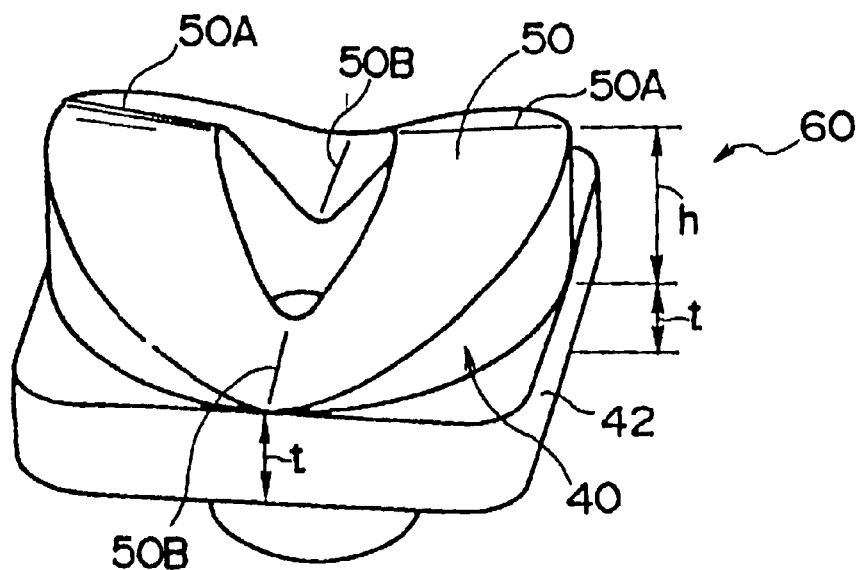
FIG. 4(A) is a perspective view of a slide cam shown for comparison with FIG. 3(A)
Figure 4B:
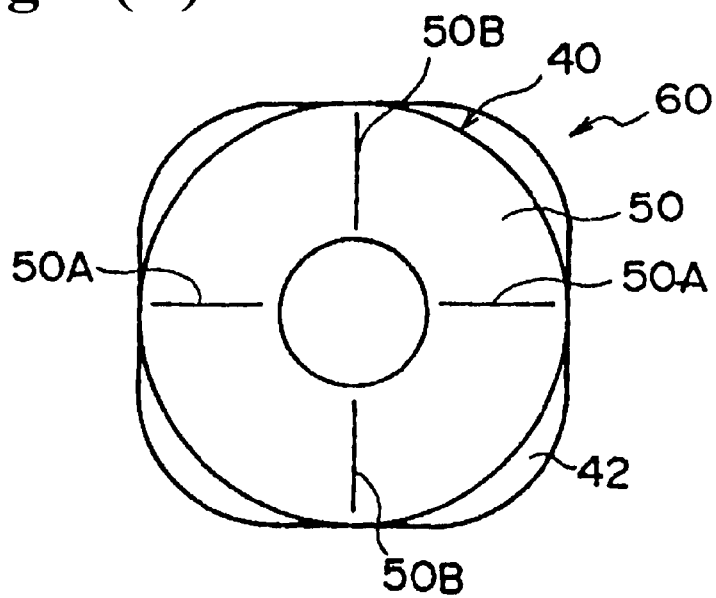
FIG. 4(B) is a plan view thereof.

For example, in a slide cam 60 in which the side surfaces of the guide plate 42 are positioned in the vicinity of the straight lines that connect the axis of the cam part 40 with the valley parts 50B of the cam surface 50 as seen in a plan view, i. e. FIGS. 4(A) and 4(B), In this case, the length that slides along the inside wall of the case 24 at the approximately centers of the side surfaces of the guide plate 42 is only equal to the thickness t of the guide plate 42 on the sides of the valley parts 50B of the cam surface 50. On the other hand, on the sides of the peak parts 50A of the cam surface 50, the length that slides along the inside walls of the case 24 is a length obtained by adding the height h of the peak parts 50A to the thickness t of the guide plate.

Accordingly, the length that slides along the inside wall of the case 24 differs between the sides of the peak parts 50A and the sides of the valley parts 50B. Consequently, the contact area with the outer circumferential surface of the cam part 40 and the side surfaces of the guide plate 42 differs on the parts of the inside wall of the case 24. Therefore, for example, when the slide cam 60 moves without the guide plate 42 being driven with a good balance, there is a danger that the axis of the slide cam 60 will shift.

Figure 6:
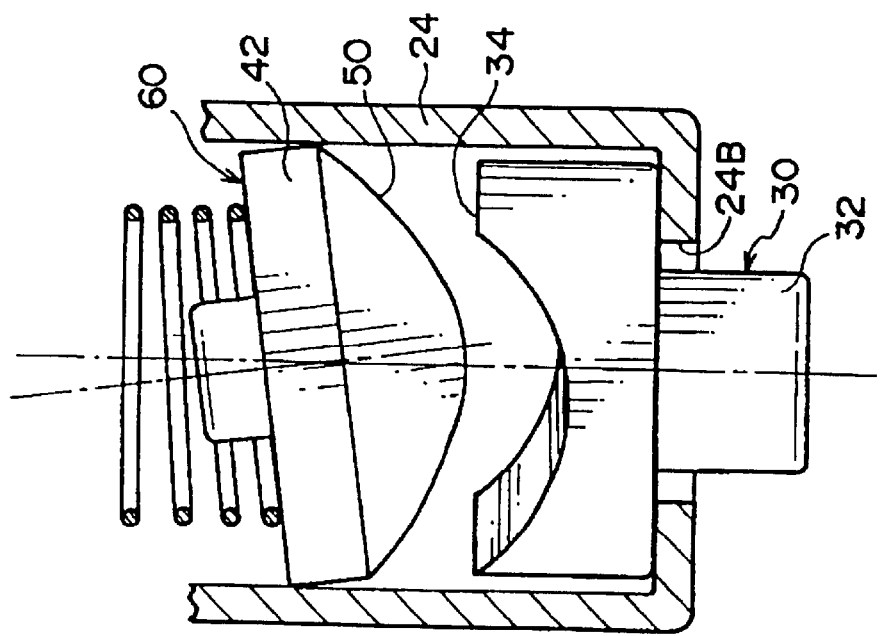
FIG. 6 is an explanatory sectional view illustrating a case in which the slide cam shown in FIG. 4(A) is used for showing a state in which a gap is formed between the slide cam and the rotating cam.
Figure 5:
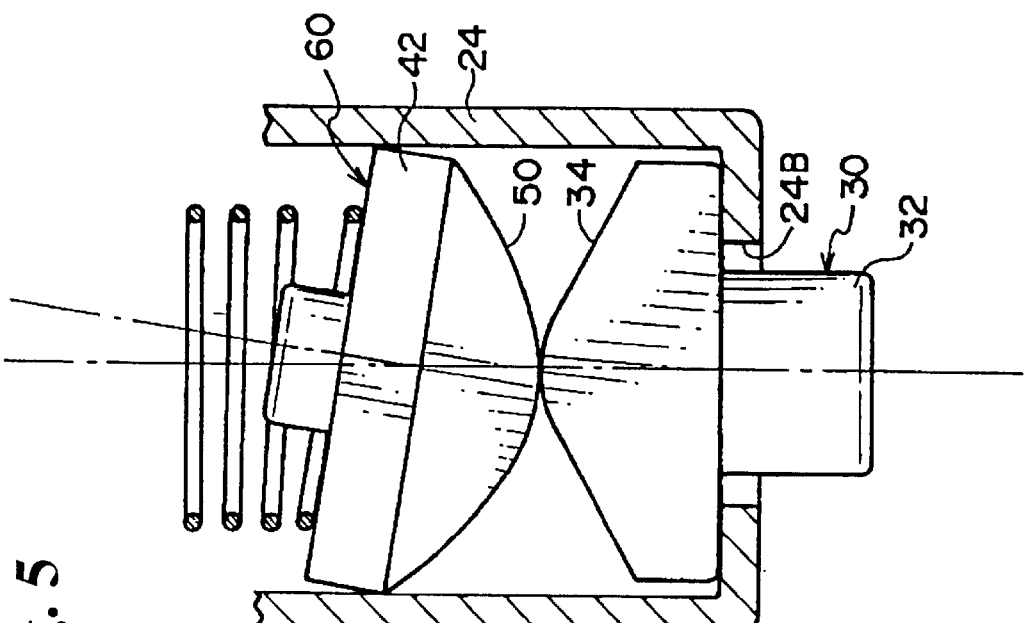
FIG. 5 is an explanatory sectional view illustrating a case in which the slide cam shown in FIGS. 4(A) and 4(B) is used for showing a state in which the slide cam is tilted.

In this case, the slide cam 60 tilts as shown in FIG. 5, so that an impact sound is generated between the slide cam 60 and the inside wall of the case 24. Furthermore, since the slide cam 60 can not move smoothly through the inside of the case 24 in a stable state, the cam surface 50 of the slide cam 60 can not trace the cam surface 34 of the rotating cam 30, so that gaps may be formed as shown in FIG. 6.

Figure 7:
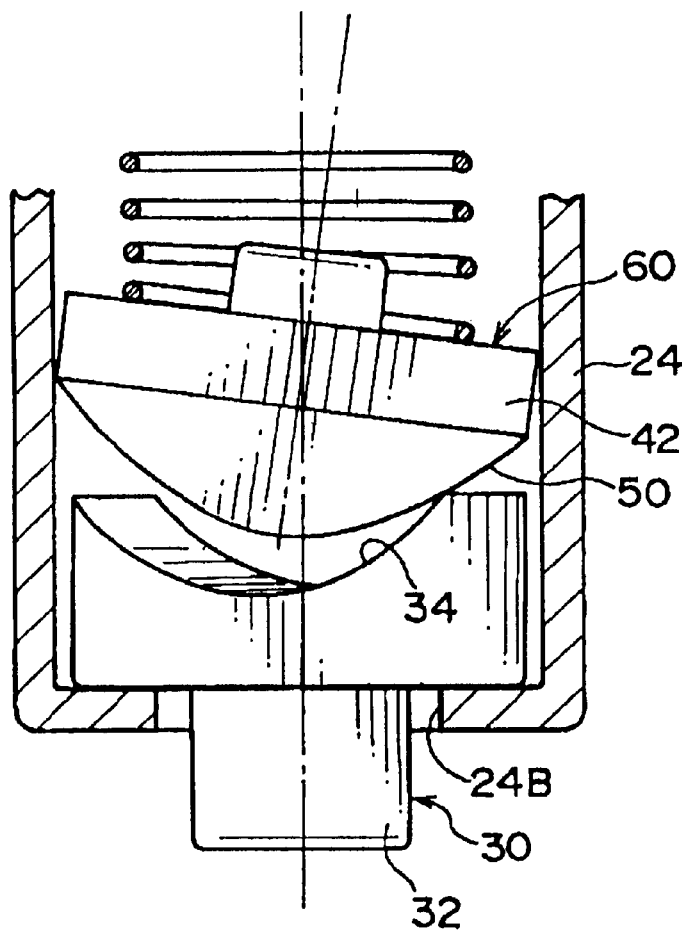
FIG. 7 is an explanatory sectional view illustrating a case in which the slide cam shown in FIG. 4(A) is used for showing a state in which the slide cam is tilted.

Even in a case where there is a movement from this state into a state in which the cam surface 50 and cam surface 34 contact as shown in FIG. 7, an impact sound is generated between the slide cam 60 and the inside walls of the case 24, or between the slide cam 60 and the cam 30.

Figure 3B:
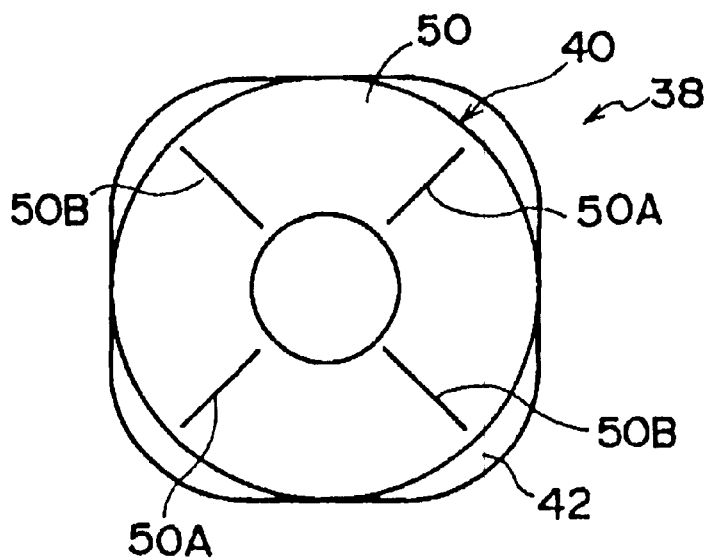
FIG. 3(B) is a plan view thereof.

On the other hand, in the case of the slide cam 38 in which the corner parts of the guide plate 42 are disposed in the vicinity of the straight lines that connect the axis of the cam part 40 and the valley parts 50B as seen in a plan view, i. e., as shown in FIGS. 3(A) and 3(B), the length that slides along the inside wall of the case 24 at the approximate centers of the side surfaces of the guide plate 42 is obtained by adding the height H to the thickness t of the guide plate 42, and this length is the same length on the respective side surfaces.

Accordingly, the contact areas of the outer circumferential surfaces of the cam part 40 and the side surfaces of the guide plate 42 are the same on the parts of the inside wall of the case 24, so that the slide cam 38 can move stably with a good balance, without any shift of the axis of the slide cam 38.

In the present configuration, as a result of the above construction, the slide cam 38 is accommodated while contacting the case 24. Consequently, there is no shifting of the axis of the slide cam 38, as in the conventional device, when the slide cam 38 moves, even if no shaft is used. Specifically, as a result of the case 24 provided with the function of a shaft, an increase in the number of parts of the hinge unit can be prevented.

Here, furthermore, shifting of the axis of the slide cam 38 is prevented by causing the slide cam 38 to contact the case 24 from the inside. However, since it is sufficient if no gap that generates an impact sound, etc., is formed between the slide cam 38 and the inside wall of the case 24 when the slide cam 38 moves, it is not absolutely necessary that the slide cam 38 contacts the case 24 from the inside.

Furthermore, since the rotating cam 30, slide cam 38, small spring 46 and large spring 48 are accommodated inside the case 24, these respective parts are not exposed. As a result, there is no mutual entanglement of a plurality of packaged hinge units 10, so that handling is easy.

Furthermore, in the hinge unit 10 of the present configuration, if the case 24 is held and a torque is applied to the rotating cam 30, the slide cam 38 and rotating cam 30 can rotate relative to each other even if the hinge unit 10 is not attached to the main body 14 and cover 20. Accordingly, torque control of the hinge unit 10 is possible, so that there is little variation in the product.

Here, the operation of the slide cam 38 and rotating cam 30 will be described.

Figure 8B:
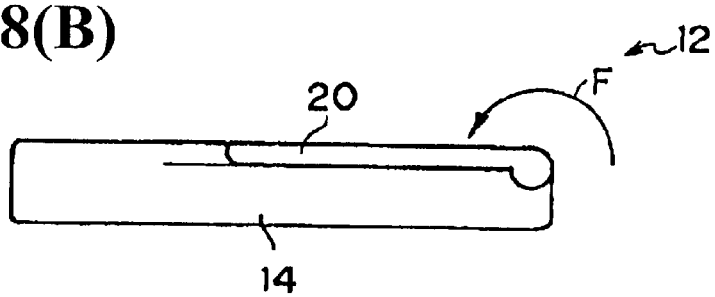
FIG. 8(B) is a side view showing a state in which the cover of the portable telephone is closed.
Figure 8C:
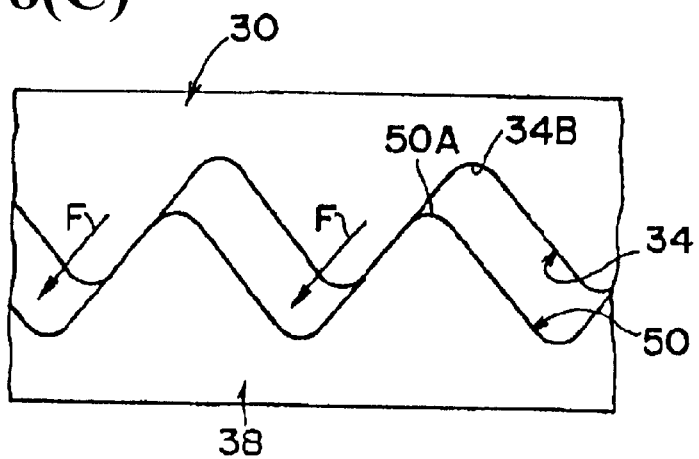
FIG. 8(C) is a view showing a state of engagement of the cam surfaces.

The cam surface 50 which can contact the cam surface 34 of the rotating cam 30 is recessed in the slide cam 38. In a state in which the cover 20 is closed, as is shown in FIGS. 8(A), 8(B) and 8(C), the peak parts 50A of the cam surface 50 of the slide cam 38 and the valley parts 34B of the cam surface 34 of the rotating cam 30 do not engage, so that the cam surfaces 34 and 50 make no contact over their entire surfaces.

Specifically, as a result of the abutment of the cam surface 50 of the slide cam 38 and the cam surface 34 of the rotating cam 30, the slide cam 38 which is urged by the small spring 46 and the large spring 48 is loaded with a force in the direction indicated by the arrow F due to the axial urging or driving force received from the small spring 46 and large spring 48.

As a result, the axial driving force of the small spring 46 and large spring 48 is converted by the rotating cam 30 into a rotational force that tends to cause rotation in the direction that closes the cover 20. Accordingly, the cover 20 can cover the main body 14 without any looseness, and will not open even if the cover 20 is turned upside down.

Figure 9A:
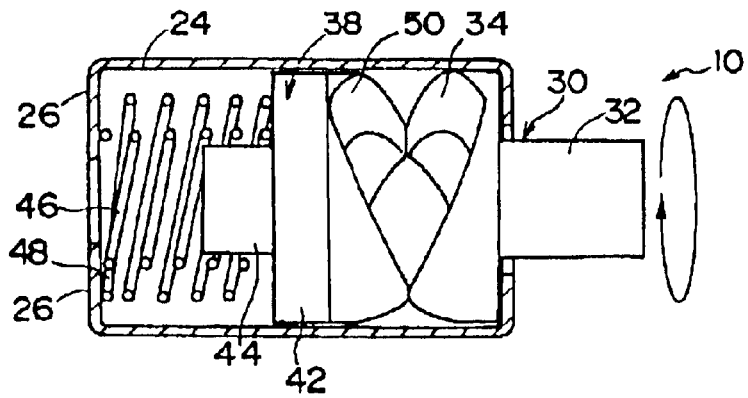
FIG. 9(A) is a side view of the hinge unit of the present invention.
Figure 9B:
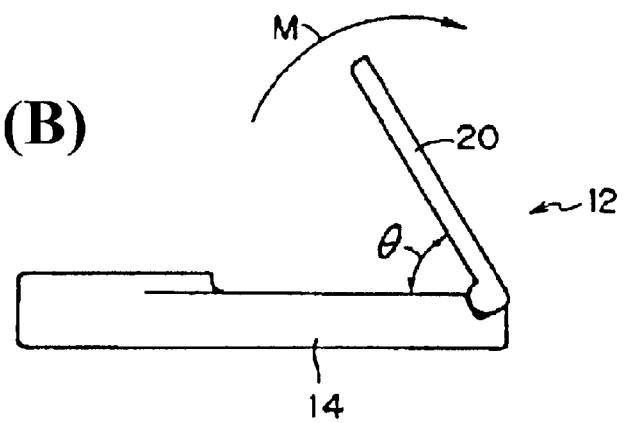
FIG. 9(B) is a side view showing a state in which the cover of the portable telephone is opened to an intermediate position.
Figure 9C:
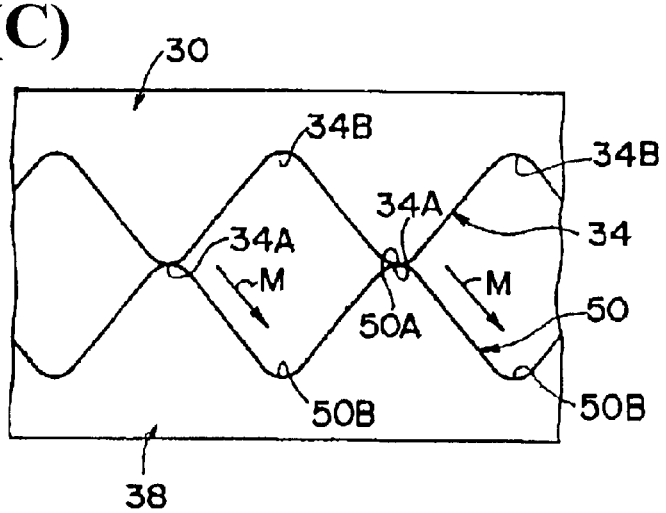
FIG. 9(C) is a view showing a state of engagement of the cam surfaces.

Next, as is shown in FIGS. 9(A), 9(B) and 9(C), when the cover 20 is opened in the direction indicated by the arrow M against the driving force of the small spring 46 and large spring 48, the slide cam 38 is pushed against the rotating cam 30 as a result of the abutment of the inclined surfaces of the cam surface 50 and the peak parts 34A of the cam surface 34, so that the slide cam 38 is pushed back into the interior of the case 24. Then, the cover 20 is opened to a position where the peak parts 34A of the cam surface 34 of the rotating cam 30 and the peak parts 50A of the cam surface 50 of the slide cam 38 abut against each other.

Here, the slide cam 38 and rotating cam 30 are molded from a synthetic resin, and a clicking feeling is obtained in the position where the peak parts 34A of the cam surface 34 of the rotating cam 30 and the peak parts 50A of the cam surface 50 of the slide cam 38 abut against each other. Furthermore, the peak parts 34A of the cam surface 34 slide over the inclined surfaces toward the valley parts 50B of the cam surface 50, so that the cover 20 naturally opens in the direction M.

Specifically, as a result of the abutment of the cam surface 50 of the slide cam 38 and the cam surface 34 of the rotating cam 30, the slide cam 38 which is urged by the small spring 46 and the large spring 48 is loaded with a force in the direction indicated by the arrow M due to the axial driving force received from the small spring 46 and large spring 48.

Figure 10A:
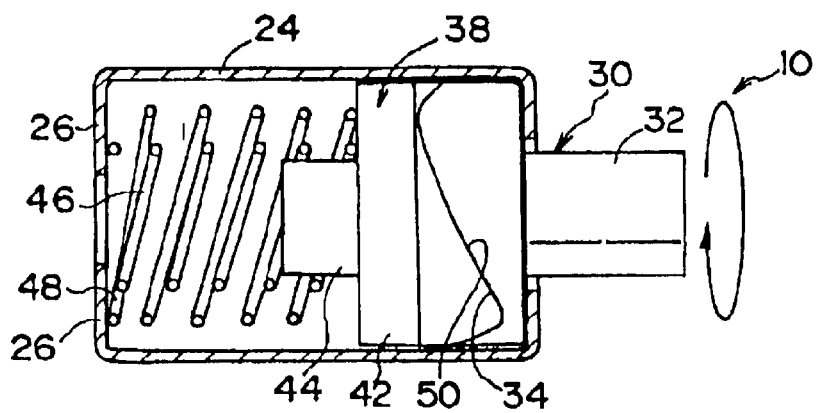
FIG. 10(A) is a side view of the hinge unit of the present invention.
Figure 10B:
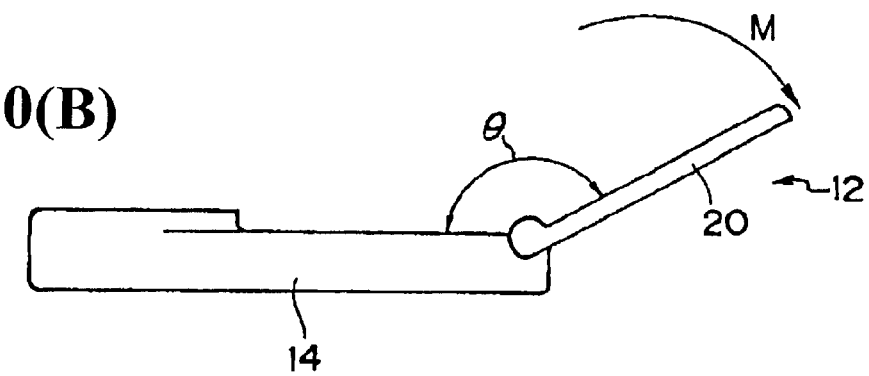
FIG. 10(B) is a side view showing a state in which the cover of the portable telephone is completely opened.
Figure 10C:
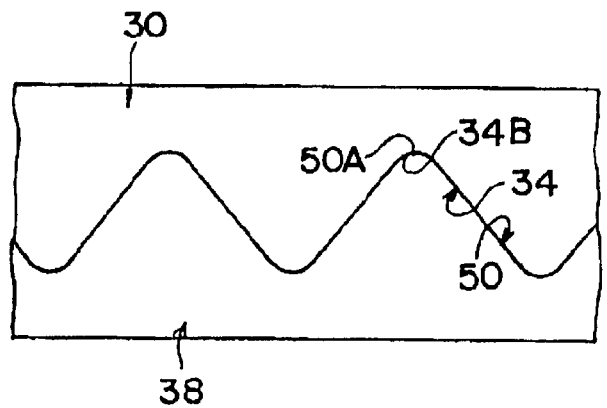
FIG. 10(C) is a view showing a state of engagement of the cam surfaces.
Figure 11:
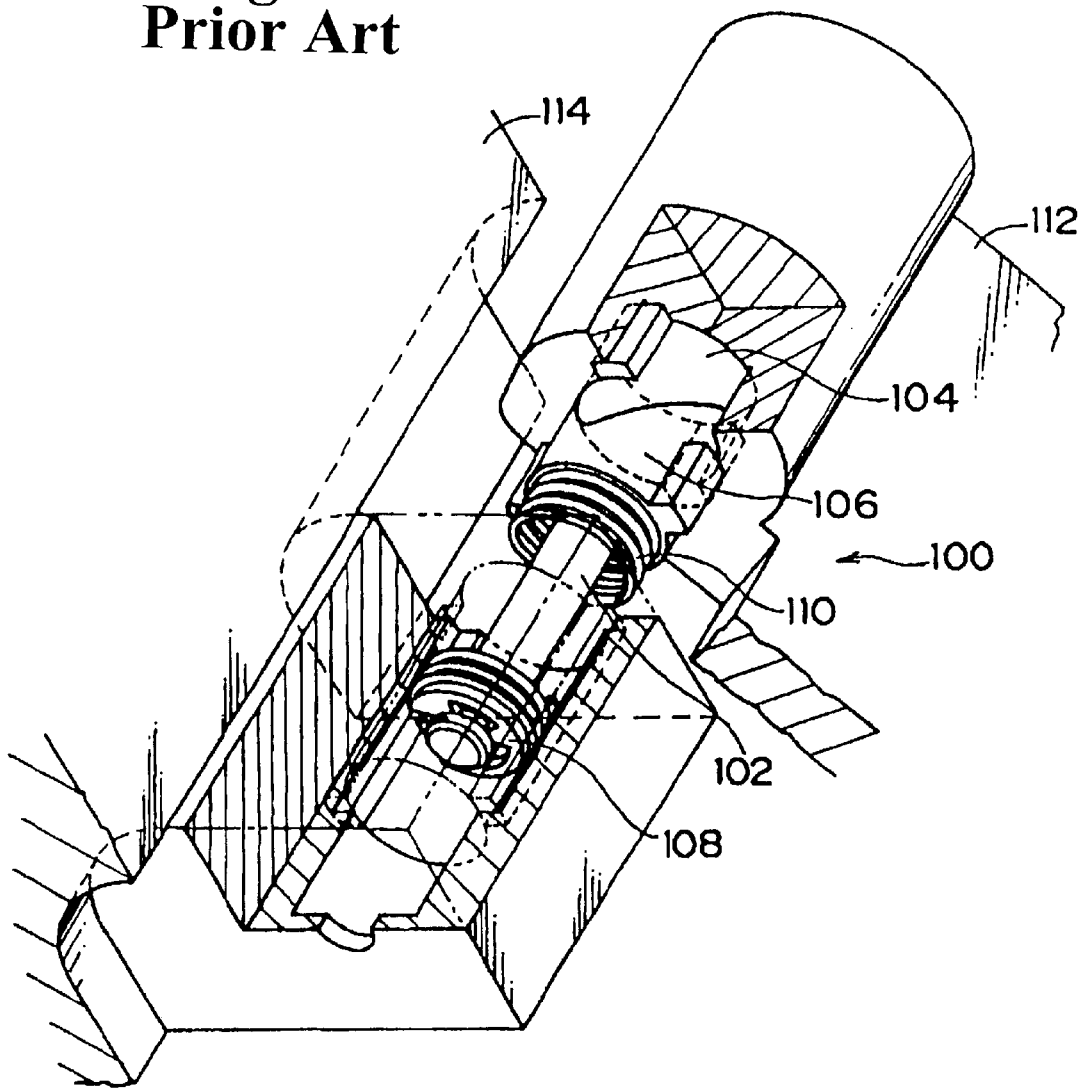
FIG. 11 is a partial sectional view which shows a conventional hinge structure.
Figure 12:
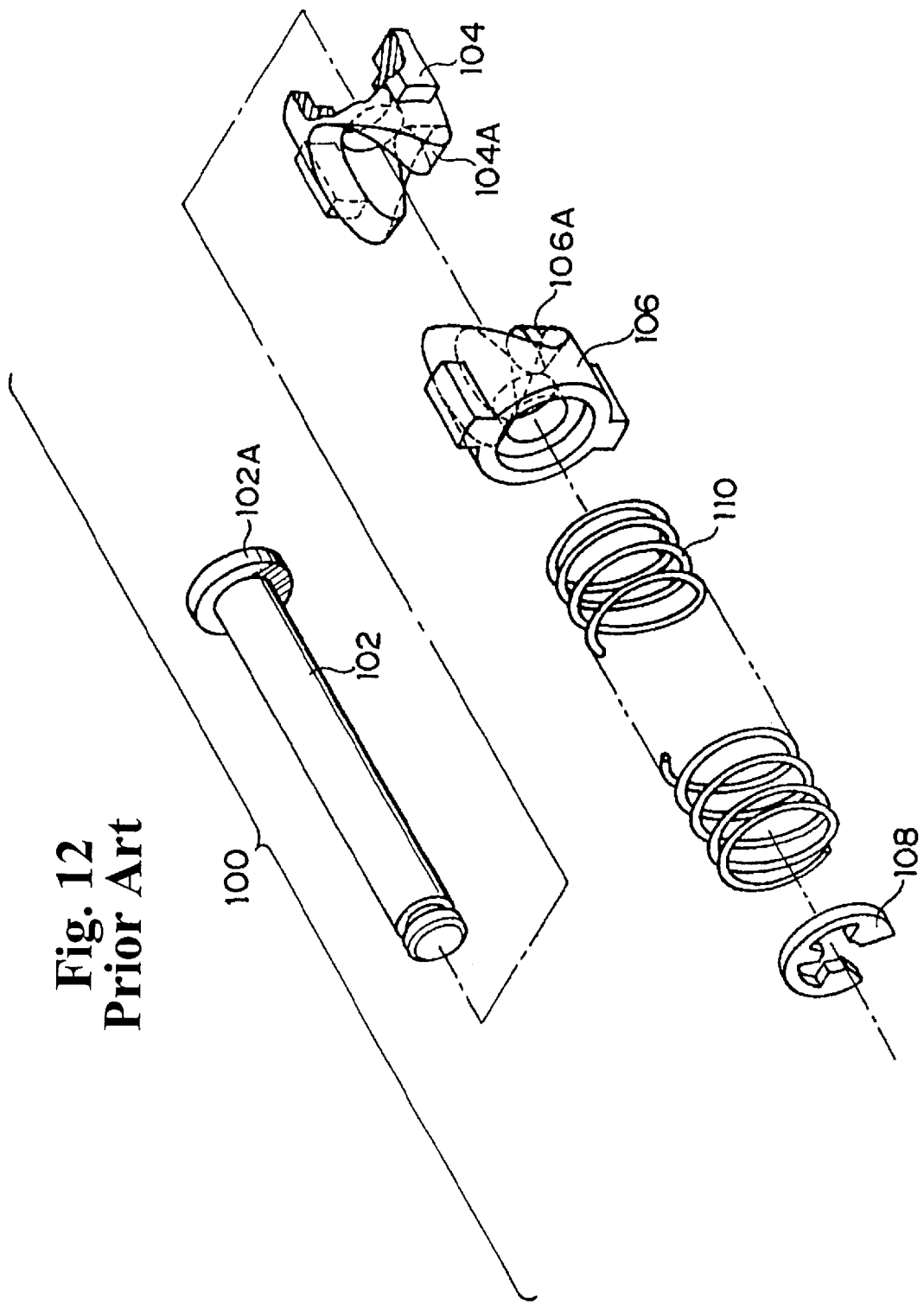
FIG. 12 is an exploded perspective view of a conventional hinge structure.

As a result, the axial driving force of the small spring 46 and large spring 48 is converted by the rotating cam 30 into a rotational force that tends to cause rotation in the direction that opens the cover 20. When the cam surface 50 of the slide cam 38 and the cam surface 34 of the rotating cam 30 make contact over their entire surfaces as shown in FIGS. 10(A), 10(B) and 10(C), the cover 20 stops. In the present configuration, the opening angle of the cover 20 in this state is set at 135°.

If an attempt is made to open the cover 20 even further from this stage, the valley parts 34B of the cam surface 34 of the rotating cam 30 ride over the peak parts 50A of the cam surface 50 of the slide cam 38. If the rotational force applied to the cover is released in this state, the slide cam 38 moves toward the rotating cam 30 by the driving force of the small spring 46 and large spring 48.

The force of this movement is converted by the cam surfaces 34 and 50 into a force that rotates the cover 20 via the rotating cam 30, so that the cover is returned to a state in which the opening angle theta of the cover 20 is 135°.

Thus, as a result of the cam surfaces 34 and 50 respectively formed on the abutting surfaces of the slide cam 38 and rotating cam 30, the hinge unit 10 can be designed as a compact unit. Furthermore, the opening angle of the cover 20 can be adjusted by varying the shape of the cam surface 34.

Furthermore, in the present configuration, the slide cam 38 contacts the inside wall of the case 24 from the inside. Accordingly, although a resistance to rotation is applied to the shaft body 22 (see FIG. 1) attached to the hinge unit 10, this resistance to rotation is minimized by making the sliding surface of the inside wall of the case 24 and the slide cam 38 smooth surfaces, so that the mutual coefficient of friction is reduced.

Here, furthermore, the case 24 was installed on the side of the main body 14, and the connecting part 32 of the rotating cam 30 was connected to the side of the cover 20. However, it goes without saying that the reverse arrangement would also be possible.

Furthermore, in the present configuration, the connecting part 32 protrudes from the rotating cam 30. However, since it is sufficient if the rotating cam 30 and shaft body 22 can be connected, it would also be possible, for example, to install a protruding part on the side of the shaft body and form a recess with which this protruding part can engage in the rotating cam, and to connect the rotating cam 30 and shaft body 22 by causing this recess to engage the protruding part.

Furthermore, a portable telephone 12 using a cover 20 capable of rotating relative to a main body 14 has been described above. However, since the product to which the present invention is applied may be any product that uses a hinge unit 10, the same effect as that of the present invention can also be obtained in a folding type portable telephone.

Furthermore, the present invention can be used not only in portable telephones, but also in other devices in which the opening angle is determined, such as the covers of an AV equipment, etc.

The present invention is constructed as described above. Accordingly, in the first, second and tenth aspects of the invention, there is no shift of the axis when the slide cam moves, even if no shaft is used. Specifically, as a result of the case provided with the function of a shaft, an increase in the number of parts of the hinge unit is prevented. Furthermore, since the slide cam, rotating cam and driving means are accommodated inside a case, there is no exposure of these respective parts.

Accordingly, there is no mutual entanglement of a plurality of packaged hinge units, so that handling is easy. Furthermore, in this hinge unit, if a torque is applied to the rotating cam while the case is held, the slide cam and rotating cam can rotate relative to each other, so that mechanical numerical values such as the required torque, etc., can be determined. Accordingly, the torque control of the hinge unit is possible, so that there is little variation in the product.

In the third aspect of the invention, since the connecting part protrudes from the case, a torque can be applied to the rotating cam without screwing any particular connecting tool, etc., into the rotating cam. Furthermore, since the case is formed in a box shape and a square guide plate is formed on the slide cam, rotation of the slide cam can be prevented by means of a simple structure.

In the fourth aspect of the invention, rotation of the connecting part relative to the accommodating part is prevented merely by forming the accommodating part with a square shape. Accordingly, there is no need to form a complicated shape as in conventional devices, so that working costs are reduced.

In the fifth aspect of the invention, not only the side surfaces of the guide plate but also the circumferential wall surface of the slide cam slides along the inside wall of the case, so that the sliding area with the inside wall of the case is increased. Accordingly, the slide cam can move stably without any shifting of the axis of the slide cam.

In the sixth aspect of the invention, the contact areas of the inside wall of the case with respect to the circumferential wall of the slide cam and the side surfaces of the guide plate are substantially the same. Accordingly, the slide cam can move stably, and there is no shifting of the axis of the slide cam.

In the seventh aspect of the invention, the slide cam can be prevented from protrusion merely by bending the closing parts. Accordingly, the working characteristics are good. In the eighth aspect of the invention, the closing parts are made more easily bendable. Furthermore, since the bending position is determined by the cut-out parts, protrusion at the bending position from the plane of the edge parts of the case can be prevented.

In the ninth aspect of the invention, the area that contacts the slide cam is increased as compared to a case in which only single driving means is used. Accordingly, the slide cam can move smoothly with a good balance. Furthermore, as a result of the use of a plurality of driving means, fine adjustment of the driving force is possible.

While the invention has been explained with reference to the specific embodiments of the invention, the explanation is illustrative and the invention is limited only by the appended claims.

What is claimed is:

1. A hinge unit comprising:
   a case having an inside wall with a rectangular shape, and a closing part for closing one end of the case,
   a circular rotating cam freely rotatably accommodated inside the case and having a connecting part protruding to an outside from the case,
   a slide cam accommodated inside the case and having a circular cam part contacting the rotating cam, and a rectangular guide plate attached to the cam part and contacting the inside wall such that the slide cam is prevented from rotating relative to the case and is moved freely in an axial direction along the inside wall of the case,
   urging means accommodated inside the case to urge the slide cam toward the rotating cam, said urging means together with the rotating cam and the slide cam being held inside the case by the closing part bent inwardly of the case, and
   cam surfaces formed on the rotating cam and the circular cam part of the slide cam to abut against each other, said cam surfaces having a contact range from a full-surface contact to a partial contact according to a relative rotational angle of the slide cam and rotating cam.

2. A hinge unit as claimed in claim 1, wherein said connecting part has a shape of a square column.

3. A hinge unit as claimed in claim 1, wherein said circular cam part of the slide cam has a circumferential wall with a diameter same as a length at one side of the guide plate.

4. A hinge unit as claimed in claim 1, wherein said cam surface of the slide cam includes peak parts and valley parts disposed at 90-degree intervals, and the guide plate has corner parts on which the valley parts and peak parts of the circular cam part are substantially positioned.

5. A hinge unit as claimed in claim 1, wherein said closing part has cut-out parts at a base thereof for determining a bending position when the closing part is bent.

6. A hinge unit as claimed in claim 1, wherein said urging means includes a plurality of springs arranged coaxially for urging the slide cam toward the rotating cam.

7. A hinge unit as claimed in claim 6, wherein said guide plate includes a protruding part formed at a side opposite to the cam part, one of the springs being attached to the protruding part and another spring being located outside said one of the springs.

8. A structure, comprising a first body having a shaft part to which the rotating cam according to claim 1 is attached, and a second body having a shaft part to which the case according to claim 1 is attached, said first and second bodies rotating relative to each other through the hinge unit of claim 1.

9. A hinge unit as claimed in claim 1, wherein said hinge unit consists of said case, said rotating cam with said cam surface, said slide cam with said cam surface, and said urging means.

* * * * *